United States Patent
Smith et al.

(10) Patent No.: US 7,380,834 B2
(45) Date of Patent: Jun. 3, 2008

(54) ASSEMBLY FOR ATTACHING A CLAMP TO A HOSE

(75) Inventors: Christopher W. Smith, Lexington, TN (US); Ben F. Holt, Lexington, TN (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 162 days.

(21) Appl. No.: 11/202,083

(22) Filed: Aug. 12, 2005

(65) Prior Publication Data

US 2007/0035122 A1    Feb. 15, 2007

(51) Int. Cl.
*F16L 55/00* (2006.01)

(52) U.S. Cl. .................. 285/23; 285/420; 285/252; 29/525.01

(58) Field of Classification Search .............. 285/23, 285/420, 252, 253; 29/890.14, 453, 525.01, 29/428, 458
See application file for complete search history.

(56) References Cited

U.S. PATENT DOCUMENTS

| | | | |
|---|---|---|---|
| 1,879,565 A | 9/1932 | Smith | |
| 3,365,218 A | 1/1968 | Denyes | |
| 3,424,482 A | 1/1969 | Ligon | |
| 3,586,354 A | 6/1971 | Boscocci | |
| 5,185,913 A | 2/1993 | Campo et al. | |
| 5,297,821 A | 3/1994 | Campo et al. | |
| 5,368,337 A | 11/1994 | Torres | |
| 5,388,321 A | 2/1995 | Farrell | |
| 5,430,252 A | 7/1995 | Petersen | |
| 5,456,784 A | 10/1995 | Cogdill et al. | |
| 5,616,205 A | 4/1997 | Cogdill et al. | |
| 5,675,871 A | 10/1997 | Webb et al. | |
| 6,390,136 B1 * | 5/2002 | Hutchins et al. | ............ 285/236 |
| 6,530,609 B1 * | 3/2003 | Chatterton | ................. 285/420 |
| 6,942,253 B2 * | 9/2005 | Bowater | ..................... 285/23 |
| 2002/0060453 A1 | 5/2002 | Spurgat | |
| 2003/0090104 A1 | 5/2003 | Woodward | |

FOREIGN PATENT DOCUMENTS

| | | |
|---|---|---|
| DE | 4112274 | 10/1992 |
| FR | 2630808 | 4/1998 |
| WO | 02/42675 A2 | 5/2002 |

* cited by examiner

*Primary Examiner*—David E Bochna
(74) *Attorney, Agent, or Firm*—Joseph V. Tassone; Thompson Hine LLP

(57) ABSTRACT

A clamp assembly comprising a clamp including a band having and a screw housing mounted to the band with a worm screw disposed in the screw housing, the worm screw engaging the band for tightening the band; and a fastener including a bonding surface, mounted to the band at a position that is displaced from the screw and screw housing, such that the fastener can be adhered to the hose without interfering with the clamp assembly.

15 Claims, 1 Drawing Sheet

ASSEMBLY FOR ATTACHING A CLAMP TO A HOSE

BACKGROUND OF THE INVENTION

The present invention relates generally to an assembly that includes a fastener for attaching a clamp to a hose.

In an effort to reduce cost and improve manufacturing efficiency, automotive OEM customers are asking suppliers to provide assemblies containing multiple components. These requests eliminate packaging and simplify handling requirements for the OEM customer, thus reducing costs and improving manufacturing efficiency. One common request is to attach pre-positioned clamps to fuel fill hoses. This allows a single operator to install a relatively large assembly. In addition, where space limitations exist, the inclusion of pre-attached, pre-positioned clamps eliminates the need for the operator to hold the clamp in place during installation. This is particularly helpful in instances in which it is not practical for the operator to hold the clamp due to space constraints.

Current methods for attaching clamps include directly bonding the clamp to the hose using an appropriate adhesive, a tape, a mechanical clip, a rivet, a vulcanized material patch, or a plastic housing, see, for example, WO 02/42675. U.S. Pat. No. 5,456,784 to Cogdill et al. discloses a tubular arrangement of elastic material for securing a clamping means to the end of a hose. U.S. Pat. No. 5,185,913 to Campo et al. discloses a fastening member having recesses therein for holding a clamp on the end of a hose. U.S. Pat. No. 3,365,218 to Denyes discloses various means for fastening a clamping member to a hose. Each of the foregoing approaches has advantages and disadvantages. For example, the rivet and mechanical clip attachments have raised concerns related to connection integrity and emission levels. Direct bonding, tape, and the use of a vulcanized patch are susceptible to oil and other contaminants and can result in sporadic performance problems. Specifically, contamination of the screw mechanism of the clamp with misplaced or excess adhesive may lead to a false installation force, e.g., the installer believes that the hose is more tightly installed than it actually is, due to the turning force required to overcome any interference created by the adhesive.

An improved hose and clamp assembly, an improved clamp subassembly and an improved method for attaching an annular clamp to a hose are needed.

SUMMARY OF THE INVENTION

In one embodiment the invention is an hose clamp assembly which includes a hose, a clamp and a fastener. The clamp includes a band and a screw housing mounted to the band with a screw disposed in the screw housing. The screw engages the band to tighten the band. The fastener is mounted to a position on the band that is distal from the screw and the screw housing along the circumference of the hose. The fastener includes a bonding surface for attaching the fastener to the hose. An adhesive is applied to the bonding surface without contaminating the screw or the screw housing to attach the fastener to the hose.

In another embodiment the invention is a method for attaching an annular clamp to a hose, where the clamp has an inner surface with an adjustable diameter. The method includes attaching a fastener to the clamp, where the fastener includes a bonding surface for attaching the fastener to the hose. An adhesive is applied to the bonding surface and the clamp is disposed to surround the hose and the clamp is held in place while the adhesive dries.

BRIEF DESCRIPTION OF THE DRAWINGS

The objects, features and advantages of the invention will appear more fully hereinafter as the description thereof proceeds, reference being made to the accompanying drawings in which.

DETAILED DESCRIPTION OF THE INVENTION

Figure 1:
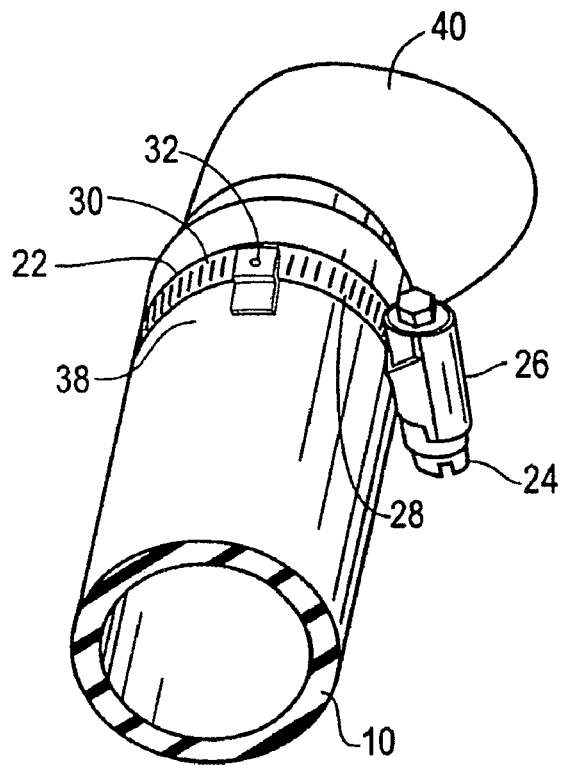
FIG. 1 illustrates a perspective view of a fastener assembled with a hose in accordance with one embodiment of the invention.

Referring now to the drawings, in particular FIG. 1, there is illustrated by way of example a conventional automotive hose 10 including a screw clamp mechanism 20. More specifically, the clamp 20 includes a slotted band 22, a screw 24 and a screw housing 26. As the screw 24 is turned, the threads of the screw 24 engage the slots 28 on the band 22 of the clamp 20. This draws the band 22 around the hose 10 thereby tightening the hose 10 around a fixture 40 onto which the hose 10 is mounted.

Figure 2:
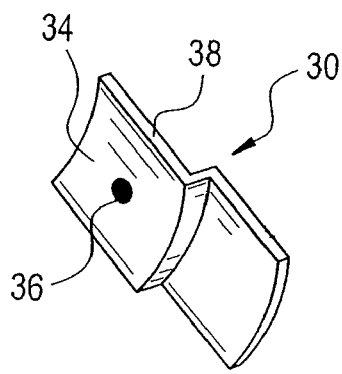
FIG. 2 illustrates a perspective view of a fastener in accordance with one embodiment of the invention prior to assembly with a hose.
Figure 3:
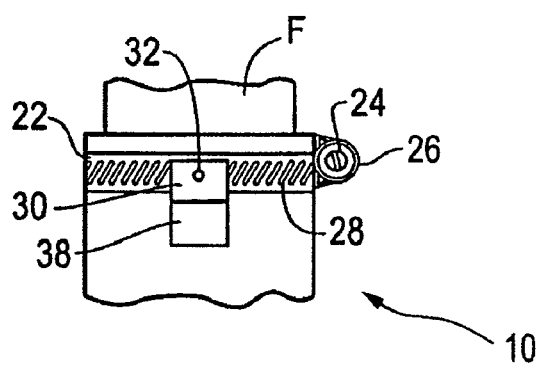
FIG. 3 illustrates a top view of a fastener assembled with a hose in accordance with one embodiment of the invention.

FIGS. 1 and 3 illustrate a fastener 30 mounted on the band 22 of the clamp 20. The fastener 30 may be mounted on the band 22 by a pin or stake 32 (as shown in FIGS. 1 and 3), a rivet, welding, or any other suitable means. The fastener 30 is mounted to the band 22 at a position distal from the screw 24 and screw housing 26 along the circumference of the hose 10. The fastener 30 includes a plate 38 that extends from the portion of the fastener 30 that attaches to the band 22. The plate 38 includes a bonding surface 34 that may be curved such that the curvature of the bonding surface 34 matches the curvature of the hose 10. The plate 38 may be offset from the portion of the fastener which attaches to the band 22. The offset may be substantially equal to the thickness of the band 22. This allows the bonding surface 34 of the plate 38 to contact the surface of the hose 10 when the fastener 30 is mounted to the band 22. A deposit of an adhesive 36 is provided on the bonding surface 34 as shown in FIG. 2. The adhesive 36 secures the fastener 30 to the hose 10.

In one embodiment, the plate 38 extends solely from one side of the portion of the fastener 10 which attaches to the band 22, as shown in FIGS. 1 and 3. In this embodiment, the band 22 may be positioned proximate to the end of the hose to be mounted onto the fixture 40. This minimizes the length of hose 10 required, thereby saving on material costs.

The fastener 30 may be formed from any suitable material; for example, it may be metallic, non-metallic, plastic, etc. Preferably, the fastener 30 is formed from a hard plastic, and, still more particularly the fastener 30 is formed from an extrusion molded plastic such as nylon or high-density polyethylene (HDPE).

A variety of adhesives or glues may be used to secure the fastener 30 to the hose 10. One useful glue is a cyanoacrylate. Preferably an adhesive or glue is selected which cures rapidly to facilitate assembly of the fastener 30 and the clamp 20 with the hose 10.

In one method of assembly, the fastener 30 is stamped, shaped and positioned on the band 22, as shown in FIG. 3.

The fastener 30 is positioned distal from the screw 24 and screw housing 26 along the circumference of the hose 10 such that any amount of excessive adhesive does not contaminate the screw 24 and screw housing 26. The fastener 30 is attached to the band 22 using a pin or stake (or any other suitable attachment method) creating a clamp subassembly.

The clamp 20 is placed over the end of the hose 10 in a position in which the screw 24 is accessible for installation and with the adhesive deposit 36 on the bonding surface 34 in contact with the outer surface of the hose 10. The fastener 30 and clamp 20 are held in place, for example using a clamp, until the adhesive 36 hardens.

Those skilled in the art will recognize that the fastener of the invention is useful in any application in which it may be desirable to supply a clamp affixed to a hose. The hose may be a fuel fill hose, radiator hose, heater hose, etc.

Having described the invention in detail and by reference to specific embodiments thereof, it will be apparent that numerous modifications and variations are possible without departing from the spirit and scope of the following claims.

What is claimed is:

1. A hose clamp assembly, comprising:
   a) a hose having an end;
   b) a clamp positioned proximate the end of the hose including a band and a screw housing mounted to said band with a screw disposed in said screw housing, said screw engaging said band for tightening said band;
   c) a substantially rigid fastener mounted on an outer surface of said band at a position on the band that is spaced from the screw and the screw housing along the circumference of the hose, said fastener including a bonding surface for attaching the fastener to the hose; and
   d) an adhesive applied to the bonding surface without contaminating the screw or the screw housing attaching the fastener to the hose;
   wherein said bonding surface of said fastener is positioned adjacent said band only on the side of the band that is distal the end of the hose.

2. The hose clamp assembly of claim 1, wherein the fastener is shaped, such that when the fastener is mounted to the band, the bonding surface is adjacent to the hose.

3. The hose clamp assembly of claim 1, wherein the bonding surface is curved.

4. The hose clamp assembly of claim 3, wherein the curvature of the bonding surface is approximately the same as the curvature of the hose.

5. The hose clamp assembly of claim 3, wherein the curved bonding surface is pre-formed.

6. The hose clamp assembly of claim 1, wherein the fastener is made from one of a polyamide, a polyamine or a thermoplastic vulcanizate.

7. The hose clamp assembly of claim 1, wherein the fastener is affixed to the clamp by a pin.

8. The hose clamp assembly of claim 1, wherein the fastener is welded to the clamp.

9. The hose clamp assembly of claim 1, wherein the fastener is affixed to the clamp by a rivet.

10. A method for attaching an annular clamp near an end of a hose, wherein the clamp has an inner surface with an adjustable diameter, wherein the method comprises the steps of:
    a) attaching a substantially rigid fastener on an outer surface of the clamp, wherein the fastener includes a bonding surface for attaching the fastener to the hose at a location adjacent the clamp only on a side of the clamp that is distal the end of the hose;
    b) applying an adhesive to the bonding surface; and
    c) disposing the clamp to surround the hose.

11. The method of claim 10 further comprising the step of;
    d) holding the clamp in place while the adhesive dries.

12. The method of claim 10, wherein the step of attaching includes fastening the fastener to the clamp with a pin.

13. The method of claim 10, wherein the step of attaching includes welding the fastener to the clamp.

14. The method of claim 10, wherein the step of attaching includes fastening the fastener to the clamp with a rivet.

15. The method of claim 10, wherein the bonding surface for attaching the fastener to the hose has a pre-formed curvature approximately the same as the curvature of the hose.

* * * * *